United States Patent Office 3,506,572
Patented Apr. 14, 1970

3,506,572
DRILLING MUD COMPOSITION AND PROCESS
Orien W. Van Dyke and Keith L. Wagner, Houston, Tex., assignors, by mesne assignments, to Dresser Industries, Inc., Dallas, Tex., a corporation of Delaware
No Drawing. Filed May 25, 1966, Ser. No. 552,700
Int. Cl. E21b 21/04; E21c 41/10; C09k 3/00
U.S. Cl. 252—8.5                                   1 Claim

ABSTRACT OF THE DISCLOSURE

Fluids for drilling, workover, and completion of wells are treated for hydrogen sulfide contamination by the addition of at least one of copper carbonate and hydrogen peroxide.

---

This invention relates to the removal of hydrogen sulfide contamination of fluids used in the drilling, completion or workover of oil wells and the like. It relates both to pretreating these fluids prior to any hydrogen sulfide contamination and the treating out of any hydrogen sulfide contamination occurring during the drilling operation.

The practice of this invention involves the use of one or both of two treating agents: basic copper carbonate which is employed both as a pretreating and post-treating agent, and hydrogen peroxide which is used as a post-treating agent at the surface when an unusually large quantity of hydrogen sulfide is present in the drilling fluid.

As indicated, the fluids of this invention are useful in the drilling, completion or workover of oil and gas wells and the like and this will be understood even though such fluids may be referred to herein as "drilling fluids" or "drilling muds."

In the drilling, completing and working over of wells, it sometimes happens that hydrogen sulfide enters the alkaline drilling fluid and acts as a contaminant. Hydrogen sulfide when present in these alkaline fluids can cause failure of high-tensile-strength drill pipe through hydrogen embrittlement. Also when present in appreciable quantities, it can be a hazard to personnel in that when the drilling fluid is discharged into the pits, the hydrogen sulfide will escape as a gas and since it is heavier than air, it will tend to collect in low spots. This gas is very poisonous to humans as well as being extremely dangerous, because high concentrations of it desensitize the olfactory nerves so its odor cannot be detected for very long periods. Instances have been known where members of a crew were rendered unconscious by hydrogen sulfide gas escaping from the drilling mud. Moreover, hydrogen sulfide frequently adversely affects the viscosity, fluid loss, and other physical properties of the drilling mud.

There are several ways that a well fluid, such as a drilling mud or packer fluid, may become contaminated with hydrogen sulfide. For example, make-up waters are sometimes used that contain small concentrations of hydrogen sulfide. Small amounts of hydrogen sulfide may be generated in deep, high temperature wells due to the thermal degradation of sulfur containing compounds in the fluid that is left in the well casing or left in the annulus between the casing and the tubing. Moreover, sulfate reducing bacteria can convert certain sulfate compounds into hydrogen sulfide and this can be a source of hydrogen sulfide in mud fluids left in the well, or it might even be possible for sulfate reducing bacteria to grow under conditions in a mud reserve pit, which would result in hydrogen sulfide contamination. Another source, and one which may result in very high concentrations of hydrogen sulfide in the well fluid, are certain porous formations that contain hydrogen sulfide along with natural gas, oil, or water. When high pressure formations containing the hydrogen sulfide are encountered in drilling, the gas, oil or water may flow into the hole and become mixed with the mud resulting in contamination, which may be sufficient to adversely effect the physical properties of the mud or may result in the muds becoming corrosive to the steel drill pipe and casing in the hole. The flow into the hole from the formation may be sufficiently large to cause cutting of the drilling mud weight thereby resulting in a "kick." If the invading fluid contains appreciable quantities of hydrogen sulfide, it will be circulated with the mud to the surface and emptied into the mud pits where the hydrogen sulfide escapes to the atmosphere creating a health hazard.

From the foregoing, it can be seen that in addition to the hydrogen sulfide occurring in relatively small concentrations in the well fluid, it can also occur in suddenly appearing large concentrations and therefore it is desirable to not only treat out the hydrogen sulfide as it appears in small concentrations but also to quickly treat it out when it appears in high concentrations, such as a result of a gas "kick."

It is therefore an object of this invention to provide an alkaline fluid useful in drilling, completing or working over a well, and a process for drilling a well using such a fluid, wherein any hydrogen sulfide invading the fluid is effectively treated out by converting it to an insoluble sulfur reaction product such that the fluid does not have its properties upset upon encountering the hydrogen sulfide or by the resulting reaction product.

It is still another object of this invention to provide a method whereby hydrogen sulfide gas arriving at the surface of the earth in drilling fluids returns can be effectively removed as such before discharging the drilling fluid into the open mud pits in the area of the drilling rig.

It has been discovered that basic copper carbonate can be added to an alkaline drilling, completion or workover fluid to react with any hydrogen sulfide entering the fluid after such addition (pretreatment) or to react with any hydrogen sulfide present in the fluid before the basic copper carbonate is added (post-treatment). The basic copper carbonate is a finely divided, easily suspendable, substantially insoluble solid that can be carried in the alkaline fluid without affecting the physical properties of the fluid, such as its viscosity, fluid loss, etc. Even though the basic copper carbonate is quite insoluble in an alkaline aqueous media (about 1 part per million) it has been found to be sufficiently reactive therein to precipitate hydrogen sulfide as copper sulfide, which is one of the most insoluble chemical compounds known, having a solubility of less than ⅓ of that of basic copper carbonate. The reaction involved is:

The resulting copper sulfide is not only insoluble for all practical purposes, but it also is inert insofar as the drilling mud properties are concerned. The carbon dioxide and water reaction products do not adversely affect the drilling fluid properties.

The amount of basic copper carbonate to be used should be a minor amount sufficient to remove any anticipated quantities of hydrogen sulfide the fluid might encounter, bearing in mind that 3.3 pounds of basic copper carbonate will remove 1 pound of hydrogen sulfide. Since this material has a very low solubility in water, nearly all of it, when added in appreciable amounts, will exist in the fluid as a suspension of solids. Thus, a reservoir of the basic copper carbonate will be present to react with any hydrogen sulfide that enters the system and the total amount of excess basic copper is not critical except the use of excessive amounts would be uneconomical. Normally, at least a quarter of a pound per barrel will be used and a practical range is 1 to 6 pounds per barrel. Amounts in this range, or even higher can be added without any undesirable effect on the mud system. In fact, there may be instances where much larger quantities would be added. For example, packer fluids may be very highly treated with basic copper carbonate, e.g. 20 pounds per barrel, to react with hydrogen sulfide which may be encountered during the long periods of time the packer fluids are left in the well thereby protecting these fluids from contamination which might tend to gradually occur, such as by the result of bacterial action. In this regard, it should be pointed out that the concept of this invention is applicable not only in connection with well fluids used in the drilling of a well but also in connection with fluids left in the well after completion, such as the above-mentioned packer fluids.

In situations where large quantities of hydrogen sulfide enter the mud system, such as where large "kicks" of formation fluids containing hydrogen sulfide gas severely cut the drilling mud, it may be desirable that another treatment, in addition to the basic copper carbonate treatment, be effected. Due to the extreme health hazard caused by the presence of large quantities of this gas in the drilling muds when discharged to the pits, it is necessary that an effective, quickly reacting treating agent be employed. It has been discovered that introducing an aqueous solution of hydrogen peroxide directly into the flowline transporting the mud from the well to the pit will effectively treat out the hydrogen sulfide contamination rendering the rig area safe for personnel. The hydrogen peroxide is readily available commercially as a 35% aqueous solution and when added to the well fluid containing the hydrogen sulfide, the reaction is as follows:

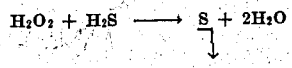

The precipitated sulfur is carried in the mud as an inert solid in a finely divided form and does not adversely effect the physical properties of the mud. It is advantageous when performing this treatment to add an excess of hydrogent peroxide solution so that substantially all of the hydrogen sulfide present in the drilling fluid will be removed prior to expelling the drilling fluid from the flowline into the pit. Due to the necessity for immediately treating out hydrogen sulfide, it is unlikely that an accurate determination of the added dosage will ever be made although it should be realized, in judging amounts to be added, that about 3 pounds of 35% aqueous hydrogen peroxide are required to remove 1 pound of hydrogen sulfide. Personnel in the area exposed to the gas will be only interested in relief from its damaging effects.

While the hydrogen peroxide solution is well adapted to treating out large quantities of hydrogen sulfide contamination, its reactive nature renders it unfit for systematic downhole treatment. After a short time in contact with the mud, it will become dissipated by reacting with other components of the drilling mud. Nevertheless, it has proven very effective in treating out large quantities of hydrogen sulfide in drilling mud returns. For example, in one test well, a fan was set up at the flowline in order to blow the excess hydrogen sulfide gas away from the area. Liquid hydrogen peroxide was added to the mud at the flowline above the shaker screen in sufficient quantity to remove the hydrogen sulfide as it was mixed in passing through the shaker screen. This was found to be a very effective way of removing the high concentrations that were experienced for short time intervals when bringing up the returns from the bottom on trips.

As an aid in practicing this invention, tests have been devised which are easily practiced in the field to quantitatively determine the hydrogen sulfide content of drilling muds and the quantity of excess basic copper carbonate present in the mud.

In the modified Hach method for hydrogen sulfide determination in mud, 8.3 cc. of the mud is diluted with 16.7 cc. of water. The mixture is placed in a sample bottle and a disc of paper impregnated with lead acetate ($H_2S$ test paper) is placed inside the sample bottle cap. An effervescent tablet, such as Alka Seltzer, is dropped into the bottle and the cap screwed in place. The sample is allowed to stand for approximately 15 minutes while the effervescent action of the tablet aerates the sample. The paper disc is then removed. If hydrogen sulfide is present, the disc's color will vary from yellow to a dark brown or black depending upon the amout of the sulfide present. Comparison of this color with a calibrated color chart indicates the quantity of hydrogen sulfide in the 25 cc. sample which is multiplied by three to determine the amount in the mud. The minimum detection limit of this test is about 0.3 p.p.m. of hydrogen sulfide. If the hydrogen sulfide in the mud is greater than 15 p.p.m., more dilution will be necessary.

The field test for the determination of the amount of basic copper carbonate in the mud is much the same as mentioned above. In performing this test, a standard solution is first made up containing 250 parts per million of hydrogen sulfide by dissolving in distilled water an equivalent quantity of sodium sulfide. In performing this test, 1 cc. of the mud to be tested is added to 23 cc. of distilled water. After adding 1 cc. of the standard hydrogen sulfide solution, the mixture is set aside for 15 minutes but agitated occasionally by swirling. Then a circle of the hydrogen sulfide test paper is placed inside the sample bottle cap, the effervescent tablet added to the sample and the cap placed on the bottle. After 5 minutes or when the effervescent tablet has dissolved, the test paper is examined.

If the test paper has not changed color, there is an excess of copper carbonate present. If a negative test is so obtained, the entire procedure is repeated increasing the amount of standard hydrogen sulfide solution by 1 cc. and reducing distilled water by a like amount. This procedure is repeated until the test paper shows that there is free hydrogen sulfide within the sample. Then by multiplying the number of cc.'s of standard hydrogen sulfide solution used by 0.31 (the basic copper carbonate equivalent of the standard hydrogen sulfide solution), the test operator can determine the number of pounds per barrel of excess basic copper carbonate contained within the drilling mud.

The principles, advantages and practice of this invention can be illustrated by the following examples.

In these examples the values in the accompanying tables for apparent viscosity (A/V), plastic viscosity (P/V), and yield point (Y/P) were determined using standard API procedure.

EXAMPLE 1

Pretreating muds with basic copper carbonate

In the laboratory two mud samples were used; one a field mud (Tests 1, 2 and 3) and the other an 8% bentonite mud treated with ½ lb. per barrel of 10–10 caustic quebracho compounded in the laboratory (Tests 4, 5 and 6). The mud properties were checked including the pH and hydrogen sulfide concentration and the mud was aged overnight at room temperature. After aging, hydrogen sulfide was metered into the sample at a rate of 400 cc. per minute for three minutes while the mud was being stirred. The mud properties were again determined and the results are shown in Test 1, Table I, for the field sample mud and Test 4 for the bentonite mud. Tests 2, 3, 5 and 6 were run in the same manner using the respective muds plus the indicated amounts of basic copper carbonate. Comparison of the analyses for hydrogen sulfide present after the pretreatment and contamination with hydrogen sulfide shows that the basic copper carbonate effectively removed the hydrogen sulfide contamination.

EXAMPLE 3

Hydrogen peroxide treatment of hydrogen sulfide contaminated muds

A field mud was used to demonstrate the use of hydrogen peroxide in treating out hydrogen sulfide contamination of drilling muds. After determining the properties of the mud sample used, hydrogen sulfide was bubbled

TABLE I

| Test | Basic $CuCO_3$, lbs./bbl. | Immediate | | | | | Aged overnight | | Aged samples after adding $H_2S$ for 3 mins. | | | | |
|---|---|---|---|---|---|---|---|---|---|---|---|---|---|
| | | pH | A/V | P/V | Y/P | P.p.m. $H_2S$ | pH | P.p.m. $H_2S$ | A/V | P/V | Y/P | pH | P.p.m. $H_2S$ |
| 1 | 0 | 9.2 | 36.5 | 29 | 15 | 0 | 9.1 | 0 | 43.5 | 34 | 19 | 7.7 | 4,000 |
| 2 | 3 | | 29.0 | 26 | 6 | | 9.3 | 0 | 30 | 26 | 8 | 7.8 | 5 |
| 3 | 6 | | 29.0 | 26 | 6 | | 9.3 | 0 | 30 | 27 | 6 | 7.9 | 0 |
| 4 | 0 | 10.3 | 37 | 30 | 14 | 0 | 9.4 | 0 | 38 | 30 | 16 | 5.9 | 4,000 |
| 5 | 3 | | 38 | 31 | 14 | | 9.3 | 0 | 37 | 29 | 16 | 5.6 | 8 |
| 6 | 6 | | 39 | 31 | 16 | | 9.3 | 0 | 34 | 34 | 20 | 6.0 | 0 |

EXAMPLE 2

Treatment of contaminated muds with basic copper carbonate

These laboratory experiments were conducted in the same manner using the same base muds as those in Example 1. However, here in each of the six experiments, the base mud was treated with 400 cc. per minute of hydrogen sulfide for three minutes. Then the indicated amounts through the sample, while stirring, at a rate of about 400 cc. per minute for two minutes and then the mud properties were redetermined and tabulated as Test 14 in Table III. To this now contaminated mud was added 3 cc. per barrel of 30% hydrogen peroxide, Test 15, which treated out the majority of the hydrogen sulfide present in the mud. Test 16 shows that the addition of one more cc. per barrel hydrogen peroxide removed any remaining hydrogen sulfide in the mud.

TABLE III

| Test | Material | pH | A/V | P/V | Y/P | P.p.m. $H_2S$ |
|---|---|---|---|---|---|---|
| 13 | Base mud | 9.0 | 37 | 30 | 14 | 9 |
| 14 | Base mud+$H^2S$ | 7.7 | 40 | 31 | 18 | 2,000 |
| 15 | Base mud+3cc./bbl. 30% $H_2O_2$. | | | | | 50 |
| 16 | Base mud+4 cc./bbl. 30% $H_2O_2$. | 8.4 | 28 | 25 | 6 | 0 | of basic copper carbonate were added. From the results on Table II it is evident that this post-treating with basic copper carbonate was effective to remove the hydrogen sulfide contamination already introduced. After aging overnight at room temperature the mud was again contacted for three minutes with the metered hydrogen sulfide. The presence of free hydrogen sulfide remaining in the mud after this contamination shows that the basic copper carbonate in the mud had all been reacted.

From the foregoing, it will be seen that this invention is one well adapted to attain all of the ends and objects hereinabove set forth, together with other advantages which are obvious and which are inherent to the method and composition.

It will be understood that certain features and subcombinations are of utility and may be employed without reference to other features and subcombinations. This is contemplated by and is within the scope of the claim.

TABLE II

| Test* | Basic $CuCO_3$, lbs./bbl. | Immediate | | | | | Aged overnight | | Aged samples after adding $H_2S$ for 3 mins. | | | | |
|---|---|---|---|---|---|---|---|---|---|---|---|---|---|
| | | pH | A/V | P/V | Y/P | P.p.m. $H_2S$ | pH | P.p.m. $H_2S$ | A/V | P/V | Y/P | pH | P.p.m. $H_2S$ |
| 7 | 0 | 7.8 | 39.5 | 31 | 17 | 4,000 | 8.2 | 3,000 | 40.5 | 29 | 23 | 7.3 | 5,000+ |
| 8 | 3 | 8.8 | 32 | 27 | 10 | 0 | 8.6 | 0 | 34 | 27 | 14 | 7.2 | 3,000 |
| 9 | 6 | 9.2 | 31.5 | 29 | 5 | 0 | 8.7 | 0 | 30.5 | 26 | 9 | 7.3 | 0 |
| 10 | 0 | 6.3 | 35.5 | 26 | 19 | 4,000 | 6.2 | 3,000 | 35.5 | 25 | 21 | 5.7 | 5,000+ |
| 11 | 3 | 6.5 | 36 | 26 | 20 | 0 | 6.4 | 0 | 38 | 27 | 22 | 5.8 | 2,000 |
| 12 | 6 | 6.7 | 39 | 32 | 14 | 9 | 6.5 | 0 | 41 | 30 | 32 | 5.8 | 0 |

*Tests 7, 8 and 9 with field mud. Tests 10, 11 and 12 with bentonite.

The addition of the basic copper carbonate in both the pretreatment and post-treatment tests had no adverse effect upon the essential properties of the muds as illustrated in Tables I and II.

The invention having been described, what is claimed is:

1. In a process for drilling a well with well drilling tools wherein there is circulated in the well an alkaline drilling mud containing particles of clayey material suspended in sufficient liquid to render the same circulatable, the method of treating out hydrogen sulfide present in the returns of said drilling mud comprising admixing with said returns a sufficient quantity of hydrogen peroxide to interact with said hydrogen sulfide, and circulating said drilling mud in said well.

References Cited

UNITED STATES PATENTS

| | | | |
|---|---|---|---|
| Re. 16,631 | 5/1927 | Gluud | 23—2 |
| 2,485,231 | 10/1949 | Bond et al. | 252—8.55 |
| 2,557,643 | 6/1951 | Fetterly | 23—2 |
| 2,605,221 | 7/1952 | Hoeppel | 252—8.5 |
| 3,307,625 | 3/1967 | Johnson et al. | 252—8.5 X |

FOREIGN PATENTS 822,841   11/1959   Great Britain.

OTHER REFERENCES

Sheppard, Pipe Line Corrosion, article in World Oil, June 1949, pp. 193, 194, 198 and 202.

HERBERT B. GUYNN, Primary Examiner

U.S. Cl. X.R.

175—65; 252—8.55